US012790481B2

(12) United States Patent
Ganguly et al.

(10) Patent No.: US 12,790,481 B2
(45) Date of Patent: Nov. 10, 2026

(54) THERMOPLASTIC COMPOSITION OF POLYCARBONATE AND POLYESTER

(71) Applicant: SABIC Global Technologies B.V., Bergen op Zoom (NL)

(72) Inventors: Anirban Ganguly, Bangalore (IN); Roshan Kumar Jha, Bangalore (IN); Susanta Mitra, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 615 days.

(21) Appl. No.: 18/276,964

(22) PCT Filed: Jan. 18, 2022

(86) PCT No.: PCT/EP2022/051019

§ 371 (c)(1),
(2) Date: Aug. 11, 2023

(87) PCT Pub. No.: WO2022/171401

PCT Pub. Date: Aug. 18, 2022

(65) Prior Publication Data

US 2024/0150571 A1 May 9, 2024

(30) Foreign Application Priority Data

Feb. 12, 2021 (EP) .................................... 21156855

(51) Int. Cl.

| | |
|---|---|
| ***C08L 67/02*** | (2006.01) |
| ***C08L 23/08*** | (2025.01) |
| ***C08L 23/0876*** | (2025.01) |
| ***C08L 51/04*** | (2006.01) |
| ***C08L 69/00*** | (2006.01) |

(52) U.S. Cl.

CPC ............... *C08L 67/02* (2013.01); *C08L 23/08* (2013.01); *C08L 23/0876* (2013.01); *C08L 51/04* (2013.01); *C08L 69/00* (2013.01); *C08L 2203/30* (2013.01); *C08L 2205/035* (2013.01); *C08L 2207/53* (2013.01)

(58) Field of Classification Search

CPC .......... C08L 67/02; C08L 69/00; C08L 23/08; C08L 23/0876; C08L 51/04; C08L 2203/30; C08L 2205/035; C08L 2207/53

See application file for complete search history.

(56) References Cited

U.S. PATENT DOCUMENTS

| | | | | |
|---|---|---|---|---|
| 5,859,137 A * | 1/1999 | Chou | C08L 23/08 | 526/272 |
| 2002/0132889 A1 * | 9/2002 | Penning | C08L 67/03 | 524/156 |

FOREIGN PATENT DOCUMENTS

| | | |
|---|---|---|
| CN | 105255149 A | 1/2016 |
| CN | 105385117 A | 3/2016 |
| CN | 108034204 B | 1/2020 |
| JP | 2008115295 A | 5/2008 |
| WO | 0245098 A2 | 6/2002 |

OTHER PUBLICATIONS

International Search Report for International Application No. PCT/EP2022/051019; International Filing Date Jan. 18, 2022; Date of Mailing Apr. 25, 2022; 3 pages.

Written Opinion for International Application No. PCT/EP2022/051019; International Filing Date Jan. 18, 2022; Date of Mailing Apr. 25, 2022; 3 pages.

* cited by examiner

*Primary Examiner* — Patrick D Niland

(74) *Attorney, Agent, or Firm* — CANTOR COLBURN LLP

(57) ABSTRACT

The present invention relates to a composition comprising at least 30 wt. % aromatic polycarbonate and at most 70 wt. % of polyester comprising poly(ethylene terephthalate), from 0.1-20 wt. % of an impact modifier, and from 0.05 to 1.0 wt. % of a monovalent ionomer comprising repeat units derived from ethylene, a dicarboxylic acid or derivative thereof, a monocarboxylic acid, and optionally a comonomer; based on the weight of the composition. The present invention further relates to an article comprising or consisting of such a composition.

18 Claims, No Drawings

THERMOPLASTIC COMPOSITION OF POLYCARBONATE AND POLYESTER

CROSS-REFERENCE TO RELATED APPLICATIONS

This application is a National Stage application of PCT/EP2022/051019, filed Jan. 18, 2022, which claims the benefit of European Application No. 21156855.5, filed Feb. 12, 2021, both of which are incorporated by reference in their entireties herein.

The present invention relates to a thermoplastic composition comprising polycarbonate and polyester. The present invention further relates to an article comprising or consisting of such a composition.

Compositions comprising polycarbonate and polyester have excellent appearance, mechanical properties, dimensional stability, and chemical resistance, and are widely used in various fields. Particularly, a composition composed of polycarbonate (PC) and poly(butylene terephthalate) (PBT) has characteristics of imparting excellent impact resistance (including low temperature impact resistance or ductility), mechanical property, and dimensional stability to the polycarbonate. These compositions are useful in fields such as interior and exterior parts in automobiles specifically.

JP2008115295A discloses a highly-processable polymer material composed of a polycarbonate/polyester resin with a compatilizer which is an olefin copolymer having a functional group which reacts with a carboxyl group which has outstanding impact resistance and can improve quality stability.

CN105385117A discloses high-/low-temperature-impact-resistance PC-PBT composite material for LED (Light Emitting Diode) aluminum-plastic structural parts.

CN108034204B discloses low-temperature impact resistant polyester compositions, wherein the composition is prepared from PBT resin with MBS toughening agent, compatilizer, ester exchange inhibitor, antioxidant and lubricant, and the preparation method of the low-temperature impact resistant polyester composition is also disclosed.

CN105255149A discloses low-temperature toughened and reinforced PC/PBT alloy materials and a preparation method thereof, wherein low-temperature impact property of the alloy is improved by adding a low-temperature toughening agent.

Polycarbonate/polybutylene terephthalate (PC/PBT) compositions are widely used in many applications such as automotive and other OVAD (Outdoor Vehicle and Devices) exteriors by its excellent property and processability, ductility (low temperature), resistance to chemical attack and weathering.

Compositions comprising polycarbonate and poly(ethylene terephthalate) (PC/PET) have been reported to have better thermal properties and more surface gloss compared to PC/PBT compositions. Additionally PET is a widely available, well-known material, used for a variety of applications including in particular bottles, such as for carbonated and non-carbonated soft drinks, fibers, and packaging, household and consumer products. PC/PET compositions are found to show less favorable low temperature ductility, i.e. ductility at temperatures in the range of about −20 to about −30° C. For achieving improved low temperature impact resistance properties, silicone-modified polycarbonate copolymer may be used, which, however is not cost effective.

It is, therefore, an object of the invention to provide for a composition comprising PC and PET that has improved low temperature impact resistance properties without significantly affecting or even improving the mechanical and other properties such as thermal properties.

To that extent the present inventors have surprisingly found that a composition comprising polycarbonate and polyester, wherein said polyester comprises poly(ethylene terephthalate), an impact modifier in combination with a specific ionomer demonstrates an improved low temperature impact resistance (without affecting mechanical and other thermal properties) compared to an otherwise identical composition wherein the poly(ethylene terephthalate) component does not contain the ionomer. Without willing to be bound to it, the present inventors believe that the presence of the specific monovalent ionomer acts as an impact synergist and helps by acting as intrinsically self-healable materials, which generates instantaneous impulsive fracture/crack or propagation resistance without any external trigger. This makes it suitable for impact resistant application where better ductility is desired.

Accordingly the present invention relates to a thermoplastic composition comprising, based on the weight of the composition, at least 30 wt. % aromatic polycarbonate, at most 70 wt. % of polyester comprising poly(ethylene terephthalate), from 0.1-20 wt. % of an impact modifier, from 0.05 to 1.0 wt. % of a monovalent ionomer comprising repeat units derived from ethylene, a dicarboxylic acid or derivative thereof, a monocarboxylic acid, and optionally a comonomer.

For the avoidance of doubt it is noted that the composition according to the invention as presented herein is a thermoplastic composition.

By application of the invention the foregoing object is met, at least in part.

Polycarbonate

Polycarbonate is a well-known material and generally exhibits good mechanical and optical properties. Typical applications include optical media carriers, glazing, extruded sheets, lenses and water bottles. Polycarbonates are generally manufactured using two different technologies. In a first technology, known as the interfacial technology or interfacial process, phosgene is reacted with bisphenol A (BPA) in a liquid phase.

Another well-known technology for the manufacture of polycarbonate is the so-called melt technology, sometimes also referred to as melt transesterification or melt polycondensation technology. In the melt technology, or melt process, a bisphenol, typically BPA, is reacted with a carbonate, typically diphenyl carbonate (DPC), in the melt phase. A polycarbonate obtained by the melt transesterification process is known to be structurally different from polycarbonate obtained by the interfacial process. In that respect it is noted that in particular the so called "melt polycarbonate" typically has a minimum amount of Fries branching, which is generally absent in "interfacial polycarbonate". Apart from that melt polycarbonate typically has a higher number of phenolic hydroxy end groups while polycarbonate obtained by the interfacial process is typically end-capped and has at most 150 ppm, preferably at most 50 ppm, more preferably at most 10 ppm of phenol hydroxyl end-groups.

In accordance with the invention, it is preferred that the polycarbonate comprises or consists of aromatic bisphenol A polycarbonate homopolymer (also referred to herein as bisphenol A polycarbonate) and not copolymers of polycarbonates. Preferably, the polycarbonate of the invention disclosed herein comprises at least 30 wt. %, preferably at least 60 wt. % of bisphenol A polycarbonate based on the total amount of polycarbonate. More preferably, the polycarbonate in the composition essentially consists or consists of bisphenol A polycarbonate.

It is preferred that the polycarbonate has a weight average molecular weight of 15,000 to 60,000 g/mol determined using gel permeation chromatography with polycarbonate standards.

In an aspect, the polycarbonate is an interfacial polycarbonate. In another aspect, the polycarbonate is a melt polycarbonate. In yet another aspect the polycarbonate is a mixture of from 20-80 wt. % of interfacial polycarbonate and from 80-20 wt. % of melt polycarbonate, based on the weight of the polycarbonate.

The polycarbonate may be a mixture of two or more polycarbonates differing in melt volume rate (i.e. in molecular weight). The polycarbonates of the mixture may both be a bisphenol A polycarbonate homopolymer.

Polyester

The polyester of the composition disclosed herein comprises, essentially consists of or consists of PET. The PET may be a mixture of two or more different poly(ethylene terephthalate)s, for example a mixture of PETs with mutually different intrinsic viscosities. The polyester may further comprise recycled poly(ethylene terephthalate).

Polyesters like poly(ethylene terephthalate) are known to a skilled person per se. In accordance with the invention the polyester can be prepared by direct polyesterification of terephthalic acid with 1,2-ethane diol (ethylene glycol), usually with the help of a strong acid catalyst in the presence or absence of co monomers like isophthalic acid (IPA).

It is preferred that the composition comprises at most 40 wt. % of polyester comprising poly(ethylene terephthalate) based on the weight of the composition and wherein the combined weight percent value of all components is 100 wt.%. It is preferred that the PET has an intrinsic viscosity of 0.4 to about 2.0 dl/g as measured in a 3:2 weight to weight mixture of pheno1:1,2-dichlorobenzene at 25 °C.

In an aspect the polyester may further comprise another polyester, miscible with poly(ethylene terephthalate), which is preferably poly(butylene terephthalate) (PBT). In accordance with this aspect of the invention, the composition preferably comprises from 99 to 80 wt. % of poly(ethylene terephthalate) and 1 to 20 wt. % of poly(butylene terephthalate) based on the weight of the polyester.

Impact Modifiers

The thermoplastic composition of the invention comprises an impact modifier. Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

The impact modifier is preferably selected from the group consisting of ethylene-vinyl acetate copolymer, ethylene-methyl-acrylate copolymer, ethylene-ethyl acrylate copolymer, ethylene-butyl acrylate copolymer, low density polyethylene, maleic anhydride grafted ethylene-octene copolymer, ethylene-ethyl acrylate-glycidyl ester copolymer, ethylene-butyl acrylate-glycidyl ester copolymer, rubber modified styrene-acrylonitrile copolymer, rubber modified styrene-acrylonitrile-methyl methacrylate copolymer, styrene-acrylonitrile copolymer and combinations of at least two of the foregoing (co)polymers.

The amount of impact modifier may be from 0.1-20 wt. % based on the weight of the composition. Preferably the impact modifier is comprised in the composition in an amount of from 2-15 wt. %, preferably from 8-12 wt. %.

Impact Synergists

The composition of the invention comprises an impact synergist, which is a monovalent ionomer comprising repeat units derived from ethylene, a dicarboxylic acid or derivative thereof, a monocarboxylic acid, and optionally a comonomer.

Ionomers are synthetic polyelectrolytes that consist of both electrically neutral and ionized groups that are randomly and/or regularly distributed along the polymer backbone. One important characteristic of ionomers is the strong molecular aggregation of the ion-carrying groups to ion rich domains or ion clusters, which act as physical crosslinks. When heated, the ionic bonds and clusters dissolve and when cooled, they reform. This gives ionomers a unique structure and behavior. At low temperatures, they behave like crosslinked polymers (elastomers) and at elevated temperatures like ordinary thermoplastics. The majority of ionomers studied have a polyvinyl or polydiene backbone and carry anionic groups (anionomers) with $Na^{+}$, and $Zn^{2+}$ as counter ions.

These ionic copolymers have typically a low melting point, improved toughness/flexibility and mechanical strength and when used as films, possess a much higher clarity and gloss and provide superior hot tack, seal strength and puncture resistance than unmodified polyethylene film.

A well known ionomer is ethylene acrylic acid copolymer (EAA) which is sold under the tradename Surlyn by DuPont. It is frequently used as a food packaging material and as a tie-layer (compatibilizer) in multi-layer films. Other important applications include coatings and surface films for golf balls, sports equipment, and for over molded (cosmetic) bottles.

In accordance with the invention, the composition comprises from 0.05 to 1.0 wt. %, preferably from 0.1 to 0.5 wt. % of a monovalent ionomer comprising repeat units derived from ethylene, a dicarboxylic acid or derivative thereof, a monocarboxylic acid, and optionally a comonomer; based on the weight of the composition. The monocarboxylic acid is selected preferably from (meth)acrylic acid. The dicarboxylic acid is preferably selected from maleic acid, fumaric acid, itaconic acid, maleic anhydride, fumaric anhydride, itaconic anhydride, one or more C1-4 alkyl half ester of maleic acid, one or more Ci-4 alkyl half ester of fumaric acid, one or more C1-4 alkyl half ester of itaconic acid, or combinations of two or more thereof. The comonomers is preferably selected from CO, acid anhydride, maleic acid, monoester of the acid anhydride, an epoxy-containing (meth)acrylate, or combinations of two or more thereof.

The carboxylic acid functionalities in the aforesaid ionomer are at least partially neutralized (from about 10 to about 70%, about 35 to about 70%) by a monovalent ion, preferably selected from alkali metal ions, more preferably from sodium or potassium. Methods for preparing ionomers from copolymers are well known in the art.

Other Additives

Typical additives that are used in the composition can comprise one or more of a flow modifier, filler, reinforcing agent (e.g., glass fibers or glass flakes), antioxidant, heat stabilizer, light stabilizer, UV light stabilizer and/or UV absorbing additive, plasticizer, lubricant, release agent, in particular glycerol monostearate, pentaerythritol tetra stearate, glycerol tristearate, stearyl stearate, antistatic agent, antifog agent, antimicrobial agent, colorant (e.g., a dye or pigment), flame retardant either or not combined with an anti-drip agent such as polytetrafluoroethylene (PTFE) or PTFE-5 encapsulated styrene-acrylonitrile copolymer.

The composition disclosed herein may comprise one or more nucleating agents. In that respect, the term nucleating agent refers to an additive that enhances the formation of crystals in the polyester phase of the composition. Addition of a nucleating agent will accordingly increase the crystallinity of the polyester phase, which results in an increased heat resistance. The composition may comprise from 0.01 to 5 wt. % by weight of nucleating agent(s).

The compositions can be manufactured by various methods known in the art. For example, polycarbonate, polyester, and other components are first blended, optionally with any fillers or additives, in a high-speed mixer or by hand mixing. The blend is then fed into the throat of a twin-screw extruder via a hopper. Alternatively, at least one of the components can be incorporated into the composition by feeding it directly into the extruder at the throat and/or downstream through a side feeder, or by being compounded into a masterbatch with a desired polymer and fed into the extruder. The extruder was set with barrel temperatures between 150 °C and 260 °C. The extrudate can be immediately cooled in a water bath and pelletized. The pellets so prepared can be one-fourth inch long or less as desired. Such pellets can be used for subsequent molding, shaping, or forming.

Shaped, formed, or molded articles comprising the compositions are also provided. The compositions can be molded into articles by a variety of methods, such as injection molding, extrusion, and thermoforming. Some example of articles include automotive and vehicular body panels such as bumper covers and bumpers or a housing for electrical equipment.

Accordingly, the present invention relates to an article comprising or consisting of the composition disclosed herein. More in particular, the present invention relates to vehicular body parts or for housing of electrical equipment comprising or consisting the composition disclosed herein. Likewise, the present invention relates to a vehicle or an electrical equipment comprising said vehicular body part or said housing. The present invention relates to the use of the composition disclosed herein for the manufacture of an article of manufacture, such as an automotive part.

Composition

In accordance with the invention the composition comprises at least 30 wt. % aromatic polycarbonate and at most 70 wt. % of polyester comprising poly(ethylene terephthalate).

The amount of polycarbonate is preferably from 30 wt. %-90 wt. % such as from 55 wt. %-70 wt. % and the amount of polyester is preferably from 10-70 wt. % such as from 30 wt. %-50 wt. %.

In an aspect, it is preferred that the monovalent ionomer is produced by neutralizing all or part of the carboxylic acid using a monovalent ion, preferably selected from alkali metal ions, more preferably from sodium or potassium.

For the avoidance of doubt the skilled person will understand that the total weight of the composition will represent 100 wt. % and that any combination of materials which would not form 100 wt. % in total is unrealistic and not according to the invention. Thus, the total of the components making up the thermoplastic composition disclosed herein is 100 wt. %.

The present invention will now be further elucidated based on the following non-limiting examples.

Test Methods

| | |
|---|---|
| Impact | Notched Izod impact (NII) properties were determined in accordance with to ISO 180/1A on injection molded samples being 80 × 10 × 4 mm in size. The test was carried out at different temperatures. 23° C., −20° C. and −30° C. The impact energy is expressed in KJ/m2. The test result is the average of 5 specimens. |
| Intrinsic viscosity | The intrinsic viscosity of the polyesters was measured in a 3:2 weight to weight mixture of phenol: 1,2-dichlorobenzene at 25° C. |
| Vicat softening temperature (VST) | The Vicat softening point (in ° C.) was determined in accordance with ISO 306 at a load of 50N and a speed of 120° C./hr on injection molded samples with dimension 10 mm (length) × 10 mm (width) × 4 mm (thickness). |
| Heat distortion temperature (HDT) | The heat distortion temperature, HDT (in ° C.) was determined in accordance with ISO 75 flatwise at a load of 1.8 MPa. |
| Molecular weight | The molecular weight of the polycarbonate and poly(butylene terephthalate) was measured by GPC method with polystyrene standard in an Agilent 1260 Infinity (SYS-LC-1260) equipment with PLGel 5 μm Minimix C 250 × 4.6 mm column and Refractive Index detector. The sample is dissolved in dichloromethane and the same solvent is used as carrier. |
| Fries branching | The amount of Fries branching was determined using an Agilent 1100 series HPLC equipped with a MWD G1365B detector. The column is an Agilent Zorbax Eclipse XDB-C18 4.6 × 75 mm. The injection volume is 50 ml. The oven temperature is 35° C. and the wavelength to acquire data is 320.16 nm. For sample preparation 0.3 g of sample is dissolved in 7.5 ml of a solvents mixture based on 5 ml of tetrahydrofuran and 2.5 ml of a 10% of potassium hydroxide solution in methanol, after heating this sample at 40° C. during 20 min, 1.4 ml of acetic acid is added. |
| End Cap Level | The endcap level was determined based on UV measurement to determine the amount of terminal OH groups. Combined with the number average molecular weight the endcap level is then determined in accordance with formula below. $\% EC = 100 - \left(\frac{ppmOH \times Mn}{340000}\right) I$ wherein % EC is the endcap level, ppm OH is the amount of hydroxyl end groups in parts per million by weight and Mn is the number average molecular weight of the polycarbonate based on polycarbonate standards. The UV spectrophotometer was a Perkin Elmer Lambda 800. Measurements were carried out on 0.01 g of a polycarbonate sample diluted in 10 ml of dichloromethane and placed into a quartz cuvette of 10 mm of optical path. The wavelength to acquire data are 284 and 292 nm. The results from the equipment as ppm of OH are used to calculate the endcap using also the molecular weight of the polycarbonate and according to the formula for calculation as disclosed herein. |
| Tensile modulus | The tensile modulus (in units of Giga pascals; GPa) and % nominal strain at break were tested according to ISO 527 measured at room temperature (23° C.). |

-continued

| | |
|---|---|
| Tensile strength | Tensile strength (in units of megapascals: MPa) and % elongation were tested according to to ISO 527 measured at room temperature (23° C.). |
| Glass transition temperature ($T_g$) | Glass transition temperatures were determined by dual cantiliver three point bending dynamic mechanical analyzer wherein the temperature was increased from 23° C. to 250° C. and frequency of 6.28 rad/sec. |
| Melt volume rate (MVR) | The melt volume rate was determined in accordance with ISO 1133-1:2011. For polycarbonate, measurements were carried out at a temperature of 300° C. and a load of 1.2 kg. For the compositions, measurements were carried out at a temperature of 250° C. and a load of 5.0 kg. |

EXAMPLES

The examples were made by extruding on a WP 25 millimeter (mm) co-rotating intermeshing twin-screw extruder having L/D of 41. The components of the compositions and their source are listed in Table 1. All components were dry-mixed and added to the throat of the extruder. The extruder was set with barrel temperatures between 150 °C and 260 °C. The material was run maintaining torque of 55-60% with a vacuum of 100 millibar (mbar)-800 mbar applied to the melt during compounding. The composition was pelletized after exiting the die head.

All samples were molded via injection molding with the molding machine set from 40-280 °C and mold set at 100 °C.

TABLE 1

Components of the compositions and their source

| | |
|---|---|
| PC1 | Bisphenol A polycarbonate manufactured using an interfacial process, having a melt volume rate of 6 cc/10 min, and endcap level of about 100%, available from SABIC (PC 105) |
| PET1 | Polyethylene terephthalate having an intrinsic viscosity of 0.84 dl/g as measured in a 3:2 weight to weight mixture of phenol:1,2-dichlorobenzene at 25° C. containing 1.85 wt. % Isophthalic acid comonomer available from SABIC (BC 212) |
| IM1 | MBS core shell impact modifier commercially available from Dow, Singapore (Paraloid MBS EXL 2690) |
| Stab | Stabilizer - hindered phenol Antioxidant Irganox 1010 from BASF |
| Quench | Mono Zinc Phosphate quencher |
| Iono1 | Surlyn PC100, $Na^+$ ionomer of ethylene acid copolymer, MFI 0.9 cc/10 min, VST~60° C., from DuPont |
| Iono2 | Surlyn PC350, $Na^+$ ionomer of ethylene acid copolymer, MFI 4.5 cc/10 min, VST~70° C., from DuPont |
| Iono3 | Surlyn 1652, $Zn^{2+}$ ionomer of ethylene acid copolymer, MFI 5.2 cc/10 min, VST~80° C., from DuPont |
| Nucl1 | Jetfine Talc 3CA having mean particle size~1 micron-- from Imerys Clays |
| Nucl2 | Imerey Talc having mean particle size~2 micron-- from Imerys Clays |

Comparative Examples (CE1) and Examples (E1-4): Table 2

TABLE 2

Formulations and properties for the PC - PET composition with $Na^+$ Ionomer impact synergist

| Components (wt. %) | CE1 | E1 | E2 | E3 | E4 |
|---|---|---|---|---|---|
| PC1 | 59.87 | 59.50 | 59.50 | 59.70 | 59.40 |
| PET1 | 30.00 | 30.00 | 30.00 | 30.00 | 30.00 |
| Stab | 0.05 | 0.10 | 0.10 | 0.10 | 0.10 |
| Quench | 0.08 | 0.10 | 0.10 | 0.10 | 0.10 |
| Iono1 | | 0.20 | | | |
| Iono2 | | | 0.20 | 0.10 | 0.40 |
| IM1 | 10.00 | 10.00 | 10.00 | 10.00 | 10.00 |
| Tensile Mod, GPa | 2.1 | 2.1 | 2.0 | 2.1 | 2 |
| Tensile Strength, MPa | 52 | 61 | 53 | 53 | 52 |
| Strain, break, % | 129 | 140 | 123 | 120 | 121 |
| NII at 23 C., kJ/m$^2$ | 69 | 66 | 78 | 74 | 65 |
| NII at −20 C., kJ/m$^2$ | 49 | 111 | 104 | 55 | 71 |
| NII at −30 C., kJ/m$^2$ | 34 | 96 | 98 | 27 | 55 |
| HDT (1.8 Mpa), ° C. | 92 | 92 | 92 | 94 | 91 |
| VST (120/50), ° C. | 131 | 136 | 135 | 134 | 133 |
| Tg (PC) by DMA, ° C. | 148.0 | 147.0 | 146.5 | 148.0 | 148.0 |
| Tg (PET) by DMA, ° C. | 81.0 | 81.0 | 80.5 | 79.0 | 80.5 |

The amounts in Table 2 are in weight percent based on the total weight of the composition. In all the examples, the total amount of components, equals 100 weight percent. Table 2 shows that the composition comprising the $Na^+$ ionomer impact synergist surprisingly shows improved low temperature (at −20 °C and −30 °C) impact resistance property, without compromising on the thermal properties as demonstrated by HDT, VST, Tg results. When comparing C1 with E1 & E2, it is observed there is an increase of at least two times in the low temperature impact resistance property resulting from the addition of the $Na^+$ ionomer impact synergist. E3 & E4 shows similar experiments with lower and higher concentrations of the ionomers respectively.

Comparative Examples (CE1) and Examples (E2 and E5): Table 3

E2 and E5 demonstrate the properties of the composition comprising the $Na^+$ ionomer and the $Zn^{++}$ ionomer impact synergists respectively. Comparing CE1 & E2 to E3, it can be seen that presence of $Zn^{++}$ ionomer does not improve the low temperature impact properties as shown in Table 3.

TABLE 3

Formulations and properties for the PC - PET composition with $Na^+$ and $Zn^{++}$ ionomer impact synergist

| Components (wt. %) | CE1 | E2 | E5 |
|---|---|---|---|
| PC1 | 59.87 | 59.60 | 59.60 |
| PET1 | 30.00 | 30.00 | 30.00 |
| Stab | 0.05 | 0.10 | 0.10 |
| Quench | 0.08 | 0.10 | 0.10 |
| Iono2 | | 0.20 | |
| Iono3 | | | 0.20 |
| IM1 | 10.00 | 10.00 | 10.00 |
| Tensile Mod, GPa | 2.1 | 2.0 | 2.1 |
| Tensile Strength, MPa | 52 | 53 | 53 |
| Strain, break, % | 129 | 123 | 127 |
| NII at 23 C., kJ/m$^2$ | 69 | 78 | 73 |
| NII at −20 C., kJ/m$^2$ | 49 | 104 | 20 |
| NII at −30 C., kJ/m$^2$ | 34 | 98 | 15 |

TABLE 3-continued

| Formulations and properties for the PC - PET composition with $Na^+$ and $Zn^{++}$ ionomer impact synergist | | | |
|---|---|---|---|
| Components (wt. %) | CE1 | E2 | E5 |
| HDT (1.8 Mpa), ° C. | 92 | 92 | 86 |
| VST (120/50), ° C. | 131 | 135 | 133 |
| Tg (PC) by DMA, ° C. | 148.0 | 146.5 | 146.5 |
| Tg (PET) by DMA, ° C. | 81.0 | 80.5 | 77.5 |

Comparative Examples (CE1) and Examples (E2 and E6-E9): Table 4

E6 and E7 demonstrate the use of different types of known nucleating agents to improve heat properties of PC/PET composition as shown by higher VST and HDT compared to CE1. However, these nucleating agents in E6 and E7 do not show any improvement in low temperature impact properties.

In E8 and E9, nucleating agents are added into the PC/PET composition comprising the $Na^+$ ionomer impact synergist. No significant improvement in low temperature impact properties is observed, although improvement in heat properties are achieved.

TABLE 4

| Formulations and properties for the PC - PET composition with $Na^+$ ionomer impact synergist in combination with nucleating agent | | | | | | |
|---|---|---|---|---|---|---|
| Components (wt. %) | CE1 | E2 | E6 | E7 | E8 | E9 |
| PC1 | 59.87 | 59.60 | 59.60 | 59.60 | 59.60 | 59.40 |
| PET1 | 30.00 | 30.00 | 30.00 | 30.00 | 30.00 | 30.00 |
| Stab | 0.05 | 0.10 | 0.10 | 0.10 | 0.10 | 0.10 |
| Quench | 0.08 | 0.10 | 0.10 | 0.10 | 0.10 | 0.10 |
| Nucl1 | | 0.20 | 0.20 | | 0.10 | 0.20 |
| Nucl2 | | | | 0.20 | | |
| Iono2 | | | | | 0.10 | 0.20 |
| IM1 | 10.00 | 10.00 | 10.00 | 10.00 | 10.00 | 10.00 |
| Tensile Mod, GPa | 2.1 | 2.0 | 2.2 | 2.2 | 2.1 | 2.1 |
| Tensile Strength, MPa | 52 | 53 | 58 | 59 | 57 | 56 |
| Strain, break, % | 129 | 123 | 126 | 130 | 135 | 131 |
| NII at 23 C., $kJ/m^2$ | 69 | 78 | 54 | 43 | 62 | 92 |
| NII at −20 C., $kJ/m^2$ | 49 | 104 | 14 | 12 | 8 | 31 |
| NII at −30 C., $kJ/m^2$ | 34 | 98 | 8 | 8 | 10 | 14 |
| HDT (1.8 Mpa), ° C. | 92 | 92 | 96 | 97 | 97 | 96.5 |
| VST (120/50), ° C. | 131 | 135 | 137 | 138 | 140 | 139 |
| Tg (PC) by DMA, ° C. | 148.0 | 146.5 | 147.0 | 148.0 | 148.0 | 148.0 |
| Tg (PET) by DMA, ° C. | 81.0 | 80.5 | 81.0 | 81.0 | 80.5 | 82.0 |

The invention claimed is:

1. A thermoplastic composition comprising, based on the weight of the composition,
   - at least 30 wt. % aromatic polycarbonate,
   - at most 70 wt. % of polyester comprising poly(ethylene terephthalate),
   - from 0.1-20 wt. % of an impact modifier,
   - from 0.05 to 1.0 wt. % of a monovalent ionomer comprising repeat units derived from ethylene, a dicarboxylic acid or derivative thereof, a monocarboxylic acid, and optionally a comonomer.

2. The composition of claim 1, wherein the monovalent ionomer is produced by neutralizing all or part of the monocarboxylic acid using a monovalent ion.

3. The composition of claim 1, wherein the monocarboxylic acid is (meth)acrylic acid; and the dicarboxylic acid or derivate thereof is selected from the group consisting of maleic acid, fumaric acid, itaconic acid, maleic anhydride, fumaric anhydride, itaconic anhydride, one or more C1-4 alkyl half ester of maleic acid, one or more C1-4 alkyl half ester of fumaric acid, one or more C1-4 alkyl half ester of itaconic acid, or combinations of two or more thereof.

4. The composition of claim 1, wherein the amount of impact modifier is from 2-15 wt. %.

5. The composition of claim 1, wherein the polyester further comprises poly(butylene terephthalate).

6. The composition of claims 1, wherein the polyester comprises from 99 to 80 wt. % of poly(ethylene terephthalate) and 1 to 20 wt. % of poly(butylene terephthalate) based on the weight of the polyester.

7. The composition of claims 1, wherein the aromatic polycarbonate comprises or consists of bisphenol-A polycarbonate homopolymer.

8. The composition of claim 1, wherein the polycarbonate has a weight average molecular weight of 15,000 to 60,000 g/mol determined using gel permeation chromatography with polycarbonate standards and/or wherein the poly(ethylene terephthalate) has an intrinsic viscosity of 0.4 to about 2.0 dl/g as measured in a 60:40 phenol/tetrachloroethane mixture at 23°-30 °C.

9. The composition of claim 1, wherein the impact modifier is selected from the group consisting of ethylene-vinyl acetate copolymer, ethylene-methyl-acrylate copolymer, ethylene-ethyl acrylate copolymer, ethylene-butyl acrylate copolymer, low density polyethylene, maleic anhydride grafted ethylene-octene copolymer, ethylene-ethyl acrylate-glycidyl ester copolymer, ethylene-butyl acrylate-glycidyl ester copolymer, rubber modified styrene-acrylonitrile copolymer, rubber modified styrene-acrylonitrile-methyl methacrylate copolymer, styrene-acrylonitrile copolymer and combinations of at least two of the foregoing (co)polymers.

10. An article comprising or consisting of the composition of claim 1.

11. The article of claim 10, wherein the article is a vehicular body part or a housing for electrical equipment.

12. A vehicle or an electrical equipment comprising the article of claim 11.

13. The composition of claim 1, wherein the monovalent ionomer is produced by neutralizing all or part of the monocarboxylic acid using alkali metal ions.

14. The composition of claim 1, wherein the monovalent ionomer is produced by neutralizing all or part of the monocarboxylic acid using sodium or potassium ions.

15. The composition of claim 1, wherein the amount of impact modifier is from 8-12 wt. %.

16. The composition of claim 1, comprising from 0.1 to 0.5 wt. % of the monovalent ionomer.

17. The composition of claim 16, comprising 55 to 70 wt. % of the aromatic polycarbonate.

18. The composition of claim 1, comprising 55 to 70 wt. % of the aromatic polycarbonate.

* * * * *